United States Patent [19]

Haataja et al.

[11] Patent Number: 5,752,781
[45] Date of Patent: May 19, 1998

[54] FIBER TROUGH COUPLING

[75] Inventors: Timothy Jon Haataja, Prior Lake; Thomas Walter Kampf, Minnetonka; Richard Alan Oftedahl, Excelsior; Wayne Albin Johnson, Rosemount; Gary F. Nault, Bloomington, all of Minn.

[73] Assignee: ADC Telecommunications, Inc., Minneapolis, Minn.

[21] Appl. No.: 818,492

[22] Filed: Mar. 14, 1997

[51] Int. Cl.$^6$ .................................................. F16B 2/00
[52] U.S. Cl. ...................... 403/387; 403/300; 403/375; 403/341
[58] Field of Search .................... 403/300, 301, 403/302, 309, 363, 402, 375, 341; 248/49; 52/11, 220.5

[56] References Cited

U.S. PATENT DOCUMENTS

| 1,862,433 | 6/1932 | Ross ........................ 403/363 X |
| 3,042,351 | 7/1962 | DuBois . | |
| 3,351,699 | 11/1967 | Mercle . | |
| 4,305,236 | 12/1981 | Williams ........................... 82/11 |
| 4,954,015 | 9/1990 | McGowan ........................ 52/11 X |
| 5,035,092 | 7/1991 | Brant ................................ 52/11 |
| 5,038,528 | 8/1991 | Brant ................................ 52/11 |
| 5,067,678 | 11/1991 | Henneberger et al. . | |
| 5,316,243 | 5/1994 | Henneberger . | |

OTHER PUBLICATIONS

EPO Publication No. 0315023, published May 10, 1989.
Product Brochure entitled "UPL-1000/UPT-1000/Corner Cable Guides" of Ditel, Inc., dated 1986.
Product Brochure entitled "FiberGuide™ Fiber Management System" of ADC Telcommunications, assignee of the present application, dated Jun., 1989.

*Primary Examiner*—Kenneth J. Dorner
*Assistant Examiner*—William L. Miller
*Attorney, Agent, or Firm*—Merchant, Gould, Smith, Edell, Welter & Schmidt P.A.

[57] ABSTRACT

A coupling for a cable routing system includes wall guides spaced apart by a thickness equal to a thickness of the walls of fiber troughs to be joined by the coupling. The wall guides carry a fastener system including a bracket disposed to oppose an external surface of a trough or fitting attached to the coupling. A fastener is carried on the bracket and is axially drivable to pierce and penetrate into the wall thickness of a coupled trough.

4 Claims, 8 Drawing Sheets

5,752,781

1
FIBER TROUGH COUPLING

I. BACKGROUND OF THE INVENTION

1. Field of the Invention

This application pertains to a system for the management and routing of optical fiber cables. More particularly, this application pertains to a coupling for joining trough members such as troughs and fittings.

2. Description of the Prior Art

In the telecommunications industry, the use of optical fibers for signal transmissions is accelerating. With the increased utilization of optical fiber systems, optical fiber cable management requires industry attention.

One area of optical fiber management that is necessary is the routing of optical fibers from one piece of equipment to another. For example, in a telecommunications facility, optical fiber cables may be routed between fiber distribution equipment and optical line terminating equipment. In buildings and other structures which carry such equipment, the cable routing can take place in concealed ceiling areas or in any other manner to route cables from one location to another.

When routing optical fibers, it is desirable that a routing system will be readily modifiable and adaptable to changes in equipment needs. Accordingly, such routing systems include a plurality of trough members such as troughs and couplings for modifying a cable routing path. The trough system members are joined together by couplings. U.S. Pat. No. 5,067,678 to Henneberger et al date Nov. 26, 1991 teaches a cable routing system that discloses a plurality of troughs and fittings. The '678 patent further discloses a coupling (element 250 in FIG. 1 of the '678 application) for joining trough members and fittings. With best reference to FIGS. 6–7 of the '678 application, a plurality of hardware is disclosed for joining the trough members. The hardware can be cumbersome. The present invention is directed towards an improved method for joining trough members and fittings.

U.S. Pat. No. 5,316,243 teaches an additional example of a coupling for alternative designs of troughs and fittings. The present invention is directed for a coupling for joining trough members and fittings such as those disclosed in U.S. Pat. No. 5,067,678.

II. SUMMARY OF THE INVENTION

According to a preferred embodiment of the present invention, a coupling is disclosed for a fiber trough system which includes trough members having a terminal end with first and second generally vertical side walls joined at lower edges by a generally horizontal bottom wall. The side walls and bottom wall are formed of plastic having a predetermined wall thickness which separates internal and external wall surfaces. The coupling includes a wall guide having first and second guiding surfaces which are spaced apart by a spacing approximate to the wall thickness. The spacing has an unobstructed opening for admitting the terminal end of the trough member into the spacing with the first guiding surface slidably engaging the internal surface of the trough member and with the second guiding surface slidably engaging the external surface of the trough member. The coupling further includes a fastener system having a bracket positioned to oppose the external surface of the trough member when the terminal end is received within the spacing. An axially drivable fastener is carried on the bracket. The fastener is drivable to a fastened position whereby the fastener penetrates into the wall thickness of the trough member.

2
III. BRIEF DESCRIPTION OF THE DRAWINGS

IV. DESCRIPTION OF THE PREFERRED EMBODIMENT

Figure 1:
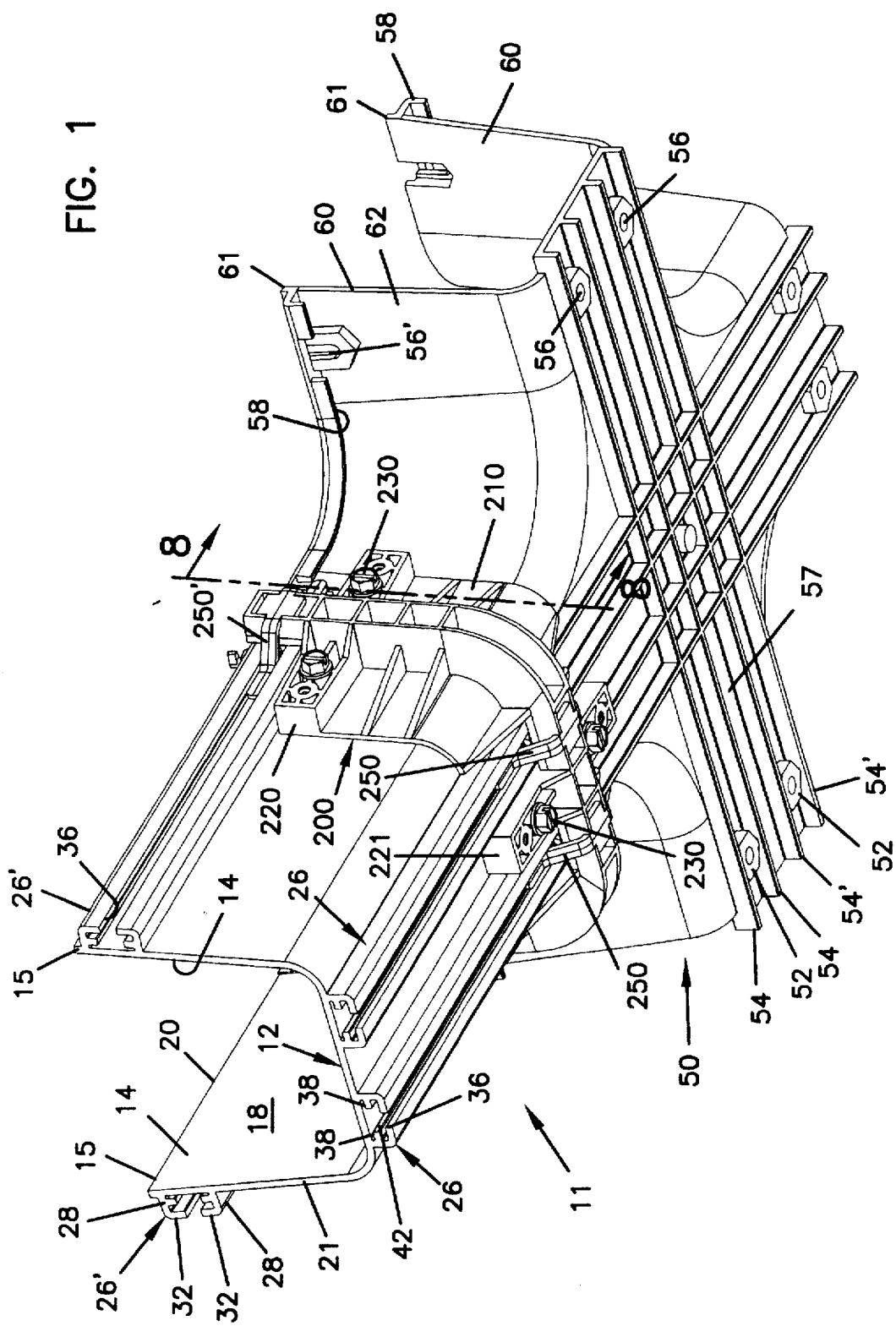
FIG. 1 is a bottom and right side perspective view of a coupling according to the present invention secured to a prior art trough and a prior art fitting.

Referring now to the several drawing figures in which identical elements are numbered identically throughout, a description of the preferred embodiment of the present invention will now be provided.

The present invention is directed to a coupling for coupling together fiber optic trough members. Examples of fiber optic trough members to be coupled are troughs numbered element 10 in FIG. 1 of the '678 patent as well as various fittings shown in FIGS. 8–64 of U.S. Pat. No. 5,067,678 which is incorporated herein by reference. As shown in the '678 patent and in FIGS. 1 and 2, troughs to be coupled are such as those shown in FIGS. 20–24 of the '678 patent. Such troughs 11 are preferably formed of plastic material through an extrusion process such that trough 11 presents the same cross-sectional profile along its entire length. Accordingly, a desired length of trough 11 can be attained by simply taking an excess length and sawing off any excess.

The trough 11 includes a bottom wall 12 joining spaced apart side walls 14 which cooperate to define a trough interior 18. The sidewalls 14 are flared outwardly slightly with the trough 11 being generally U-shaped in cross-sectioned. The trough interior 18 is exposed through an upper opening 20 extending along the upper end of the trough. The trough terminates at terminal ends 21.

The trough 11 is identical to that shown in U.S. Pat. No. 5,067,678 and includes a plurality of attachment members 26,26'. Each of the attachment members is identical and extends parallel to the longitudinal axis of the trough 11.

In a preferred embodiment, each of the attachment members 26 is integrally formed with the trough 11 and simultaneously extruded with the trough 11. Accordingly, each of the attachment members 26,26' presents an identical cross-section at any given location along the longitudinal dimension of the trough 11. The attachment members 26,26' are preferably disposed with one member 26' on the outer surface of each side wall 14 adjacent the upper edge 15 of the wall, and with two attachment members 26 disposed in parallel alignment, spaced apart, along the outer surface of the bottom wall 12.

Figure 2:
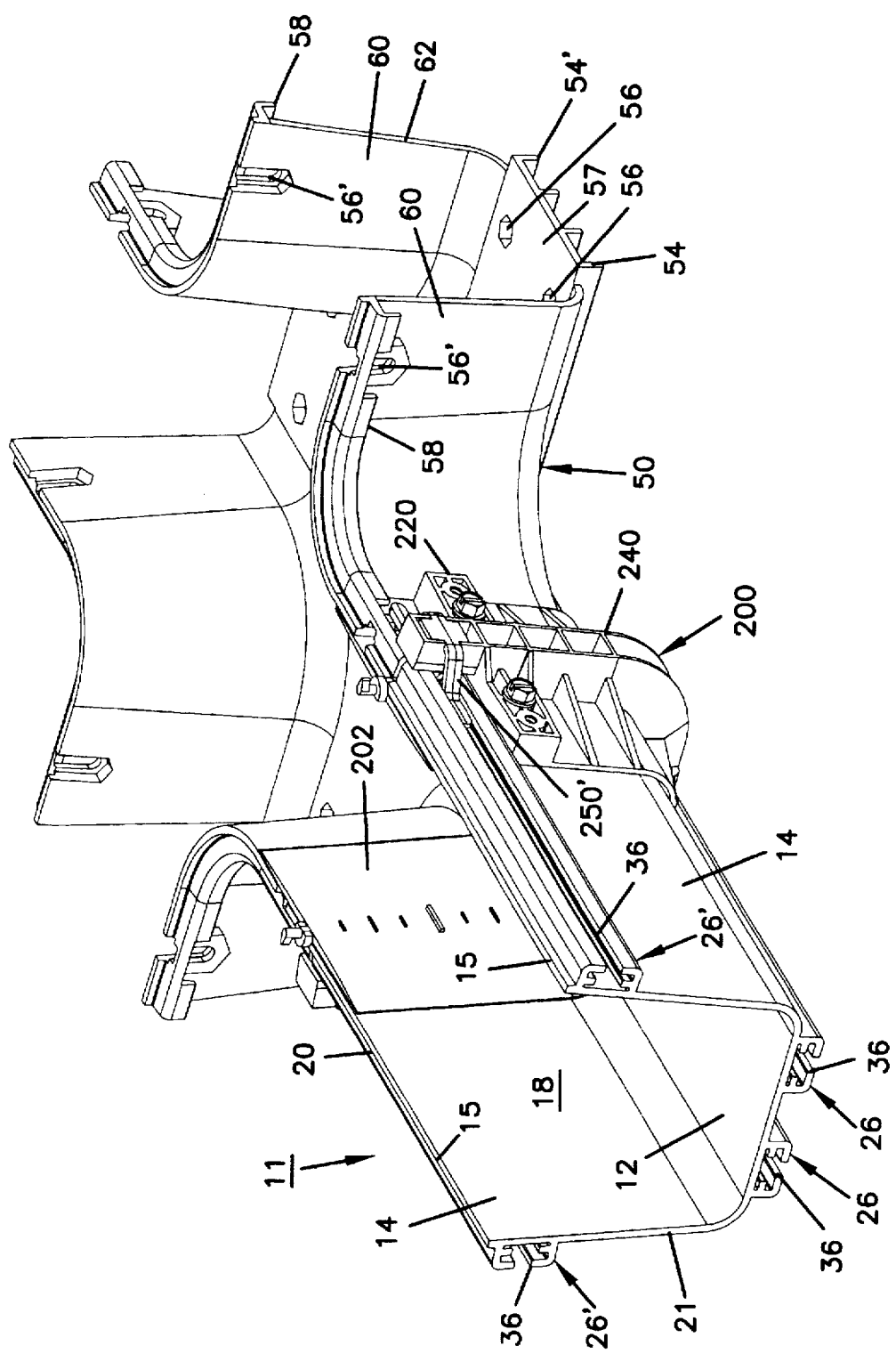
FIG. 2 is a top and side perspective view of the trough, coupling and fitting of FIG. 1.

Shown best in FIGS. 1 and 2, each of the attachment members 26,26' includes spaced-apart side plates 28, which extend generally perpendicular to the wall of attachment (i.e., walls 14 or 12). Plates 28 terminate at inwardly-projecting flanges 32. Opposing flanges 32 are spaced apart to define a bolt shaft slot 36 sized to slidably receive the shaft of a bolt of predetermined dimension as disclosed in U.S. Pat. No. 5,067,678.

Spaced inwardly from flanges 32 each of side plates 28 are provided with inwardly-projecting intermediate ribs 38.

Ribs 38 are spaced apart to define a bolt head receiving slot 42 as disclosed in the '678 patent.

The trough 11 is preferably mounted in a building facility with its longitudinal axis extending in a generally horizontal line and with the upper opening 20 facing upwardly. However, it will be appreciated that in any given installation, the installer may position a trough 11 in any position or orientation he may desire.

While trough 11 is suitable for acting as a conduit for cables from one location to a linearly displaced location, it is desirable in such an installation for a routing system to include bends and turns. To provide such flexibility to the routing system, a plurality of fittings are provided for the system.

As shown in U.S. Pat. No. 5,067,678, all fittings present a cross-section the same as that of the troughs such that each of the fittings defines a cable pathway which, when connected to troughs, provides for a continuous cable pathway which includes bends, dips and turns.

A fitting 50 of the prior art is shown in FIGS. 1 and 2. The fitting 50 includes lower bore holes 56 for passing bolts in a prior art coupling technique shown in the '678 patent. The bore holes 56 reside in ribbed pathways 54,54' positioned on the bottom surface 57 of the fittings. The pathways 54, 54' are spaced apart equal to the spacing and sizing of attachment members 28 to linearly align therewith. Further, bore holes 56' are provided adjacent ribbed guides 58 along the upper edges 61 of the side walls 60. The bore holes 56,56' are all spaced from the terminal ends 62 of the fittings by a pre-determined distance.

The present invention is directed toward a novel coupling design for use with troughs and fittings such as those disclosed above and in the '678 patent. The novel coupling design eliminates the need for the cumbersome metal attachment plates and other hardware utilized in the '678 coupling design.

Figure 3:
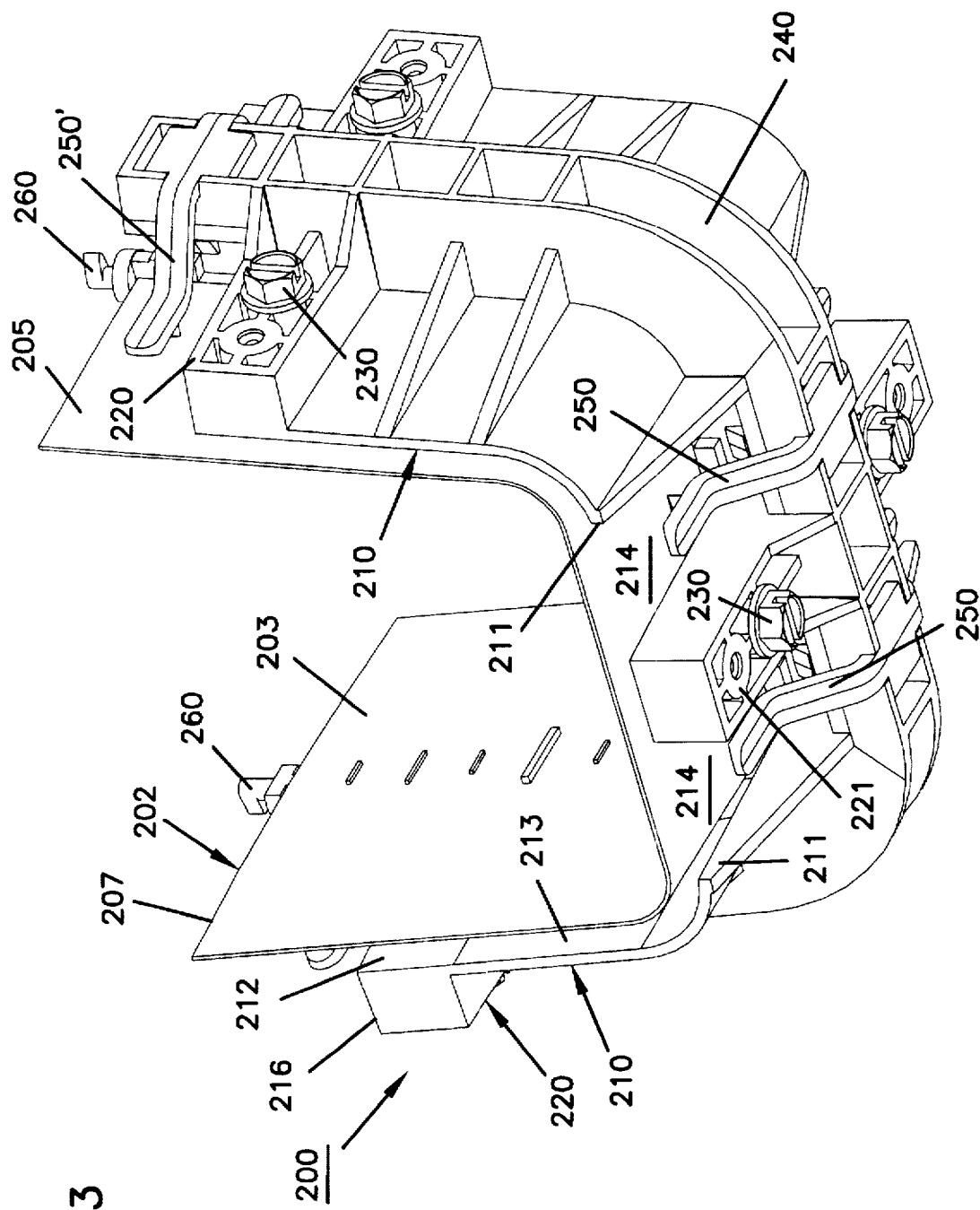
FIG. 3 is a front, bottom and side perspective view of a coupling according to the present invention.

The novel coupling 200, as shown in FIG. 3, includes a generally U-shaped inner trough 202 which is U-shaped in configuration and has an interior surface 203 complimentary to the interior surface of the walls 14,60 and base 12,57 of the trough 11 and fittings 50. Accordingly, the exterior surface 205 of the inner trough 202 can slidably engage the interior surface of the walls 14, 12, 57, 60 of the trough 11 and fittings 50.

Figure 6:
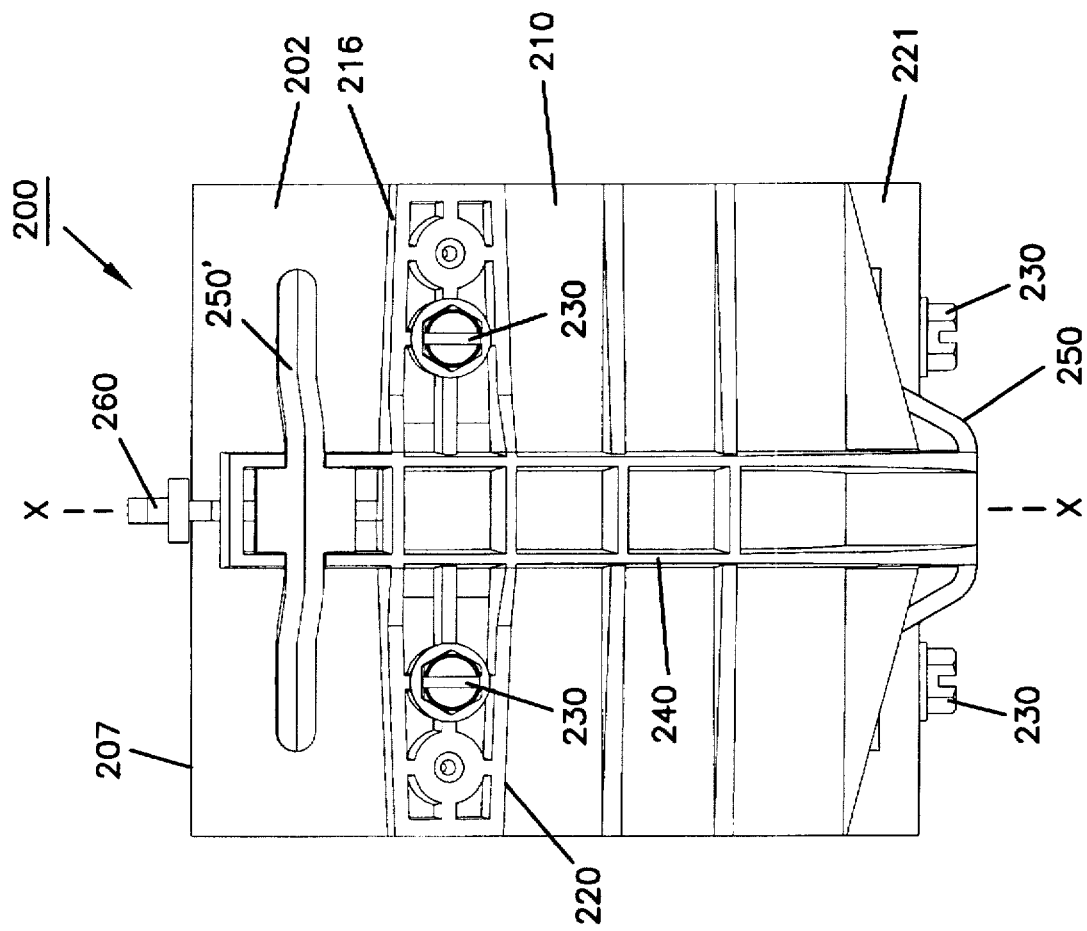
FIG. 6 is a side elevation view of the coupling of FIG. 3.
Figure 7:
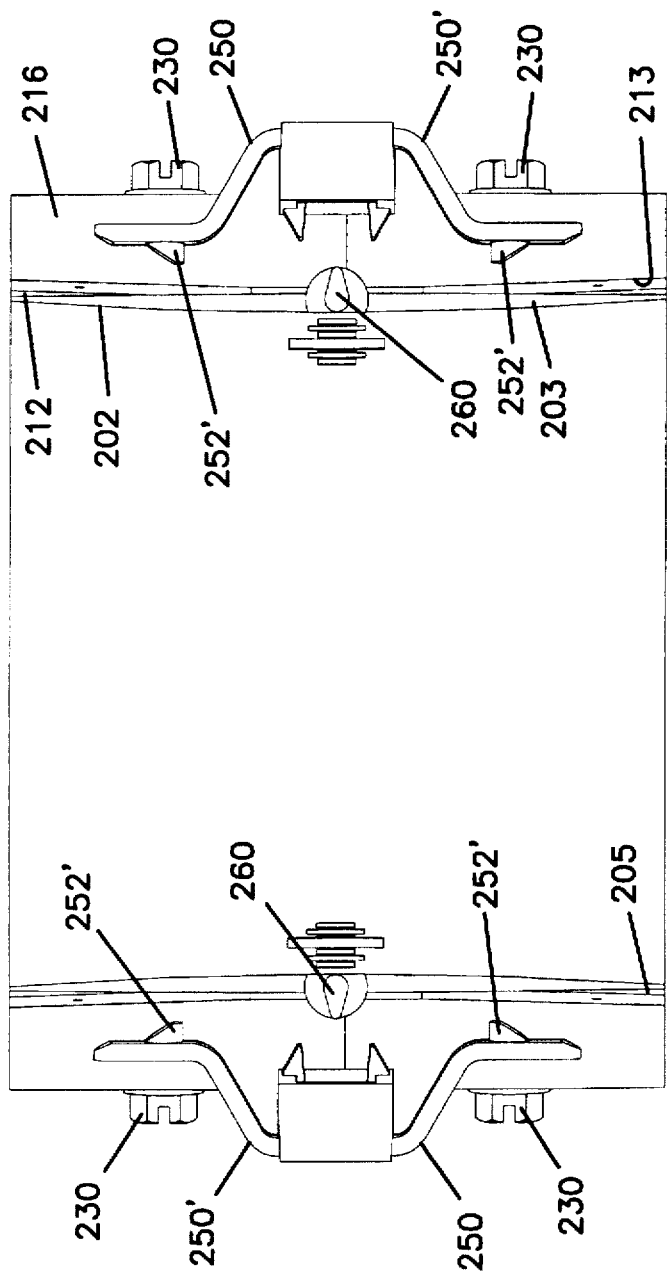
FIG. 7 is a top plan view of the coupling of FIG. 3.

The coupling 200 is symmetrical about a plane X—X (FIG. 6), dividing the coupling into left and right halves. A description of the right side will suffice as description of the left side.

The coupling 200 includes a second guide wall 210 defining an outer trough 212 with the second guide wall having interior surface 213 shaped complimentary to the exterior surface of the walls 12, 14 of the troughs and fittings. The walls 213 and 205 are separated by a predetermined spacing equal to the wall thickness of the troughs and fittings.

The upper ends 216 of the outer trough wall terminate spaced from the upper end 207 of the inner trough wall by a distance equal to the height of the attachment members 26' on the side walls 14 of the trough 11. Accordingly, the troughs 11 may be inserted into the spacing between the outer trough 210 and inner trough 202 with the attachment members 26' abutting and riding on the upper ends 216 of the outer trough 210.

The upper ends 216 of the outer wall 210 are also provided with fastener brackets 220 for purposes that will be described. A fastener bracket 221 is centrally positioned beneath the bottom edges 211 of the outer trough to define two recesses 214 spaced between the bottom edges 211 of the outer trough 210 and the lower bracket 221.

The recesses 214 are sized and positioned approximate to the thickness and location of the attachment members 26 on the bottom surface 12 of the prior art trough 11 (as well as the bottom rails 54,54' of fitting 50) such that the bottom attachment members 26 of the prior art troughs (and rails 54,54') may slide between the bottom edges 211 of the outer wall 210 and the mounting bracket 221 when the terminal end 21 of the trough 11 is inserted into the spacing.

Figure 8:
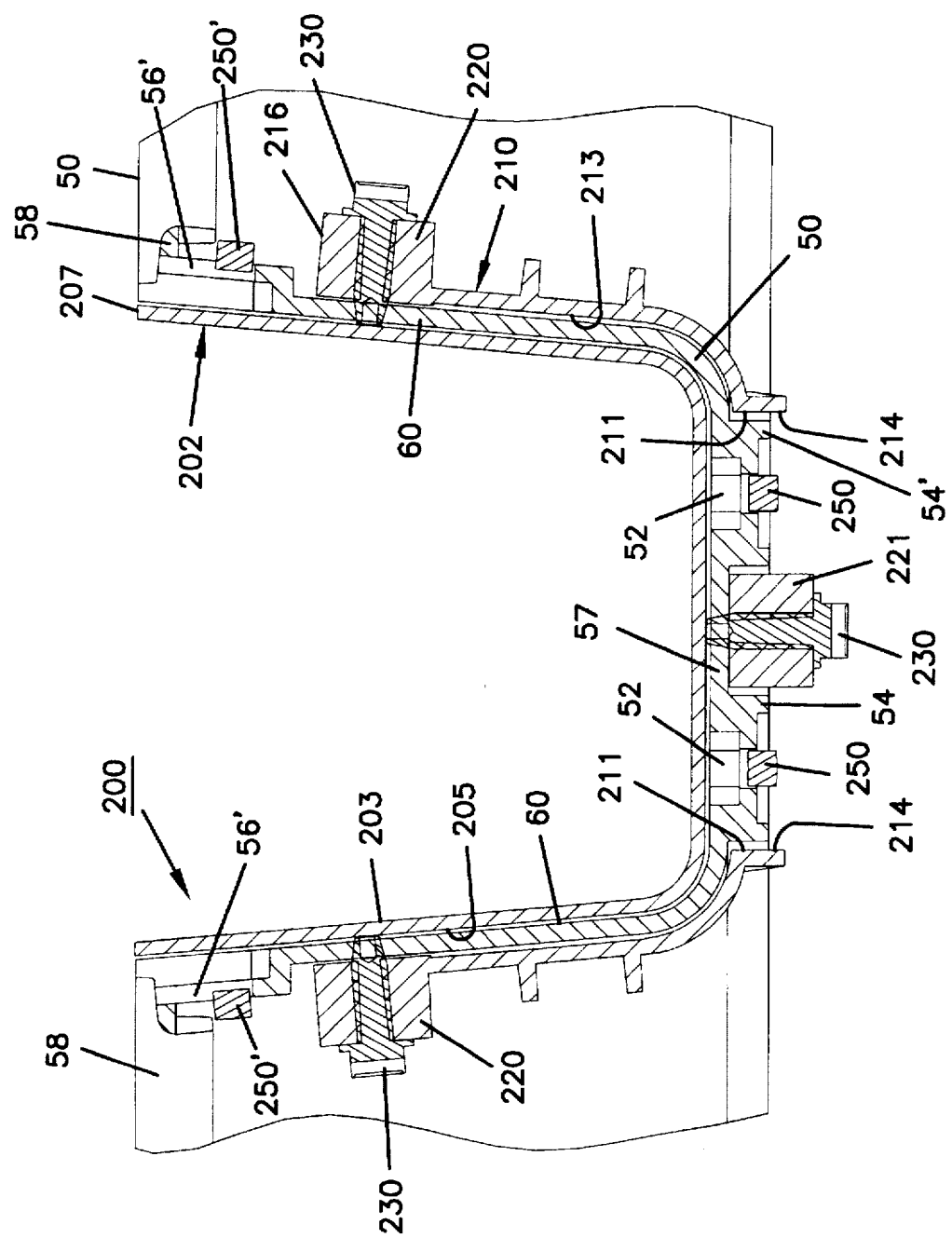
FIG. 8 is a view taken along the line 8—8 of FIG. 1.

Each of the brackets 220,221 contains a self-tapping screw 230 which is inserted with the cutting end of the screw not penetrating into space 213. The screw 230 may be axially advanced upon turning to a maximum insertion equal to a depth of penetration to penetrate into the wall thickness of the trough and fittings as best illustrated in FIG. 8. Preferable, the screw is sized so as not to penetrate into the interior 18 of the trough 11.

Figure 4:
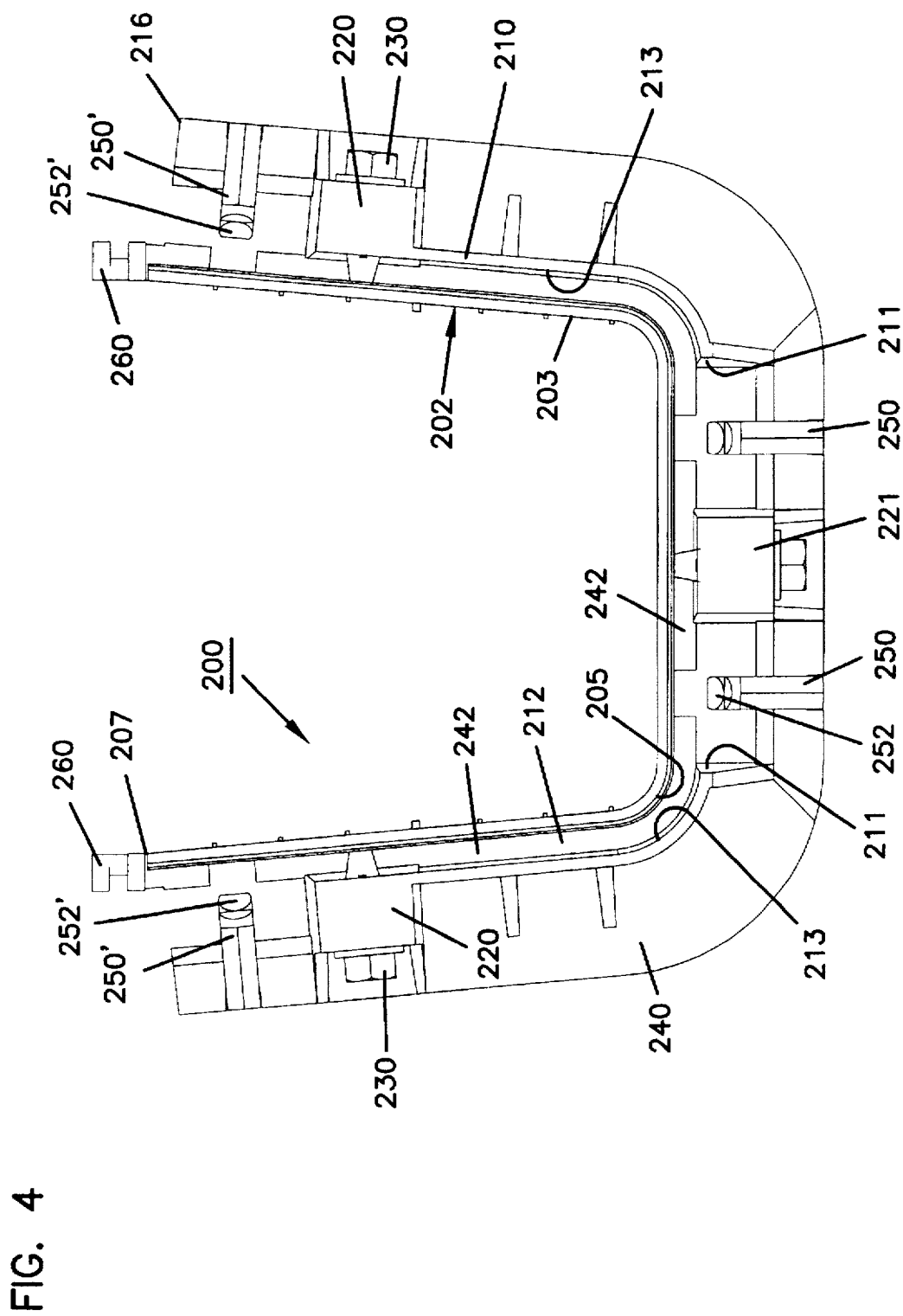
FIG. 4 is an end elevation view of the coupling of FIG. 3.
Figure 5:
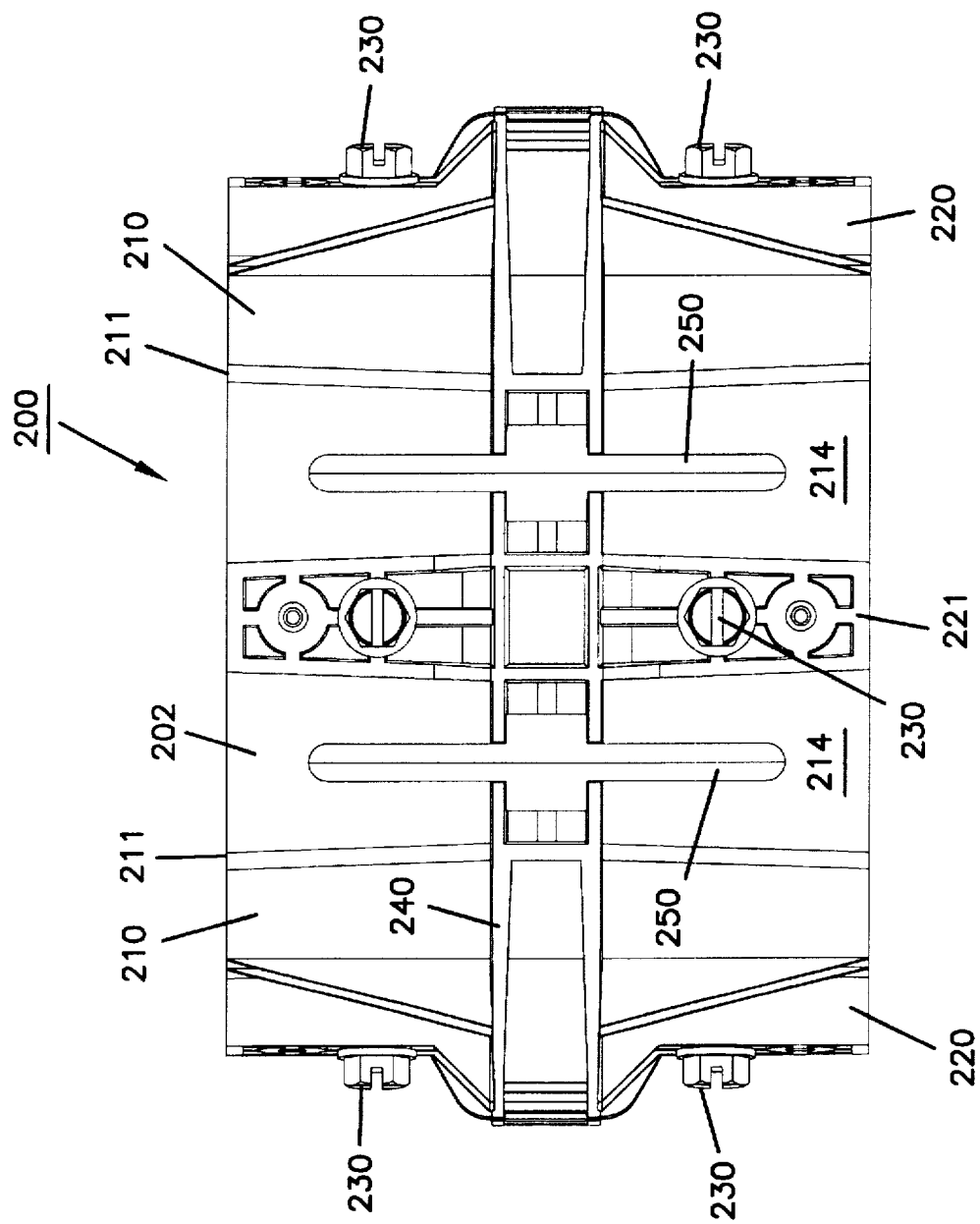
FIG. 5 is a bottom plan view of the coupling of FIG. 3.

A central reinforcing rib 240 extends surrounding the exterior of the coupling 200. Further, a stop-wall 242 (FIG. 4) surrounds the inner trough 202 to provide a stop surface for a trough or fitting inserted into the spacing 213.

The reinforcement bracket 240 carries two spring members 250 on the bottom surface of the coupling 200. The spring members 250 are positioned with spring tabs 252 disposed to be received within the openings 56 of the prior art fittings 50 when a fitting is inserted into the spacing 213. If a trough member 11 is inserted, the tabs 252 are received within the spacing 36 of the lower attachment member 26. Similarly, identical springs 250' are mounted with tabs 252' to be received within holes 56' of a fitting or slots 36 of upper attachment members 26'.

The upper edges of the coupling 200 include pivot brackets 260 so that a cover (not shown), may be pivotally secured to the coupling 200 to retain fibers in the interior of the troughs as is conventional.

With the construction thus described, the prior art troughs 11 and fittings 50 of the '678 patent may be coupled with the coupling 200 of the present invention and without the need for the cumbersome hardware used in the coupling system disclosed in the '678 patent. No additional hardware need be manipulated by an operator other than simply inserting the terminal ends 21,62 of a trough 11 or fitting 50 into the spacing 213 of the coupling 260 until the terminal end 21,62 abuts the interior stop-wall 242. At that point, the screws 230 contained within the mounting brackets 220, 221 can be turned to bite into the plastic material of the trough 11 or fitting 50 and securely couple the trough 11 or fitting 50 to the coupling 200. The coupling 200 is self-aligned with respect to either the trough 11 or fitting 50 with the spacings 214 between the external trough walls 211 and the bracket 221 accommodating, in loose fitting tolerance, the projections 26, 54, 54' on the external surfaces of the prior art troughs 11 and fittings 50 to act as guiding surfaces to maintain proper alignment of a trough or fitting within the coupling 200.

In the embodiments shown, the coupling is symmetrical about the central plane X—X so that identical fittings or trough geometries can be joined by the coupling. From time to time, it may be desirable to join dissimilar troughs. For example, the trough of the '678 patent may be joined with a trough or fitting having the geometry such as that shown in U.S. Pat. No. 5,316,243 (incorporated herein by reference). In such a case, the present coupling 200 need not be symmetrical about its central plane X—X. Instead, one side (for example the left side in the view of FIG. 6) may be as that shown in the drawings and the right side may be the geometry on that shown on the right side of the coupling in FIGS. 1-9 of U.S. Pat. No. 5,316,243 with such a hybrid coupling having a smooth transition from the right side to the left side. Therefore, the present invention may be utilized with prior art troughs to provide a transition between different trough and fitting geometries.

From the foregoing detailed description of the present invention it has been shown how the objects of the invention have been obtained in a preferred manner. Modifications and equivalents of the disclosed concepts are intended to be included within the scope of the claims which are appended hereto.

What is claimed is:

1. A coupling for a fiber trough system including trough members having a terminal end with first and second generally vertical side walls joined at lower edges by a generally horizontal bottom wall and where said side walls and bottom wall are formed of plastic having a predetermined wall thickness separating internal and external wall surfaces, said coupling comprising:

a wall guide having first and second guiding surfaces spaced apart by a spacing sized to receive said wall thickness and having an unobstructed opening for admitting said terminal end into said spacing with said first guiding surface slidably engageable with said internal surface and with said second guiding surface slidably engageable with said external surface, said first guiding surface having a generally U-shaped configuration including first and second generally vertical side wall portions joined at lower edges by a generally horizontal bottom wall portion wherein said second guiding surface at least partially surrounds said first and second generally vertical side wall portions of said first guiding surface;

a fastener system positioned on said wall guide and including a bracket disposed to oppose said external surface when said terminal end is received within said spacing, an axially driveable fastener carried on said bracket in a first position to provide unobstructed passage of said terminal end past said fastener and into said spacing, said fastener axially driveable into said spacing and toward said first guiding surface to a second position with said fastener penetrable into said wall thickness, said fastener sized so as to not penetrate through said first guiding surface.

2. The coupling according to claim 1 wherein said coupling includes a stop engageable with said terminal end.

3. The coupling according to claim 1 wherein said trough members include raised areas on said external surfaces, said wall guide including said second guiding surface defining termination points sized to receive said raised areas.

4. The coupling according to claim 3 wherein said raised areas include a recess, said coupling further comprising resilient tabs positioned to deflect into said recesses when said terminal end is inserted into said spacing.

* * * * *

UNITED STATES PATENT AND TRADEMARK OFFICE
Certificate

Patent No. 5,752,781                    Patented: May 19, 1998

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Timothy Jon Haataja, Prior Lake, Minn.; Thomas Walter Kampf, Minnetonka, Minn.; Richard Alan Oftedahl, Excelsior, Minn.; Wayne Albin Johnson, Rosemount, Minn.; Gary F. Nault, Bloomington, Minn.; and Roy L. Henneberger, Apple Valley, Minn.

Signed and Sealed this Nineteenth Day of November 2002.

ANTHONY KNIGHT
*Supervisory Patent Examiner*
Art Unit 3676